United States Patent [19]

Schulz

[11] 4,152,119

[45] May 1, 1979

[54] BRIQUETTE COMPRISING CAKING COAL AND MUNICIPAL SOLID WASTE

[75] Inventor: Helmut W. Schulz, Harrison, N.Y.

[73] Assignee: Dynecology Incorporated, Harrison, N.Y.

[21] Appl. No.: 820,432

[22] Filed: Aug. 1, 1977

[51] Int. Cl.$^2$ ............................ C10L 9/10; C10L 5/00
[52] U.S. Cl. ..................................... 44/1 D; 44/10 A; 44/10 G; 44/16 R
[58] Field of Search ................ 44/1 R, 1 D, 14, 10 A, 44/10 B, 10 R, 10 G, 15 B, 16 R, 1 E

[56] References Cited

U.S. PATENT DOCUMENTS

| 1,747,919 | 2/1930 | Welton | 44/14 |
|---|---|---|---|
| 3,640,016 | 2/1972 | Lee et al. | 44/1 R |
| 3,910,775 | 10/1975 | Jackman | 44/1 D |

FOREIGN PATENT DOCUMENTS 673659  6/1952  United Kingdom .................... 44/15 B

*Primary Examiner*—Carl Dees

[57] ABSTRACT

Briquettes of specified geometry and composition are produced to serve as feed material or "burden" in a moving-burden gasifier for the production of a synthesis or fuel gas from organic solid waste materials and coal, including especially, the so-called "caking" coals, as in the process of copending application number 675-918. The briquettes are formed from a well-blended mixture of shredded organic solid wastes, including especially, municipal solid waste (MSW) or biomass, and crushed caking coal, including coal fines. A binder material may or may not be required, depending on the coal/MSW ratio and the compaction pressure employed. The briquettes may be extruded, stamped, or pressed, employing compaction pressures in excess of 1000 psi, and preferably in the range of 2000 to 10,000 psi. The briquettes may be circular, polygonal, or irregular in cross-section; they may be solid, or concentrically perforated to form a hollow cylinder or polygon; they may be formed into saddles, pillows or doughnuts. The ratio of caking coal to shredded municipal solid waste is controlled so that each part of the predominately cellulosic organic solid waste will be blended with 0.5 to 3.0 parts of crushed coal. Suitable binder materials include dewatered sewage sludge (DSS), "black liquor" rich in lignin derivatives, black strap molasses, waste oil, and starch. The binder concentration is preferably in the range of 2 to 6 percent. If coals high in sulfur content are to be processed, at least a stoichiometric equivalent of dolomite may be included in the briquette formulation to eliminate a major fraction of the sulfur with the slag.

10 Claims, No Drawings

BRIQUETTE COMPRISING CAKING COAL AND MUNICIPAL SOLID WASTE

CROSS-REFERENCE TO RELATED APPLICATION

This application is related to my copending application Ser. No. 675,918 filed Apr. 12, 1976, U.S. Pat. No. 4,052,173 the entire disclosure of which is hereby incorporated by reference and relied upon. The process disclosed and claimed in my copending application is referred to hereinafter as the Simplex Process. The Simplex Process is briefly described as a process for the production of gaseous effluent rich in hydrogen and carbon monoxide from a feed mixture of coal-like material and organic solid waste, which process is carried out in a vertical reaction zone comprising, successively, a Preheating and Drying zone in the top portion thereof, a Pyrolysis and Coking zone, a High Temperature Reaction zone, and a Partial Combustion zone, which process comprises the steps of:

(a) thoroughly blending said coal-like material and said organic solid waste in a ratio of 0.25 to about 2.5 parts of coal-like material to one part of organic solid waste;

(b) introducing said thoroughly blended mixture of coal-like material and organic solid waste to the top section of said vertical reaction zone and allowing said mixture to flow downwardly through said Preheating and Drying zone while maintaining said Preheating and Drying zone at a temperature of from about 200° F. to about 500° F. at the upper end thereof and a temperature of from about 600° F. to about 900° F. at the lower end thereof;

(c) allowing the preheated and dried mixture of said coal-like material and said organic solid waste to flow downwardly into said Pyrolysis and Coking zone wherein said mixture is directly contacted with hot gaseous products comprising hydrogen and carbon monoxide rising from the Partial Combustion zone through the High Temperature Reaction zone thereby causing the destructive distillation of said coal-like material and the simultaneous pyrolysis of said organic waste to carbonaceous products comprising coke and char, said Pyrolysis and Coking zone being maintained at a temperature of from about 600° F. to about 900° F. at the upper end thereof and a temperature of about 1600° F. to about 2000° F. at the lower end thereof;

(d) allowing said carbonaceous products from said Pyrolysis and Coking zone to flow successively downward through said High Temperature Reaction zone and said Partial Combustion zone;

(e) maintaining said High Temperature Reaction zone at a temperature of from about 2000° F. to about 2800° F.;

(f) introducing into said Partial Combustion zone an oxidant gas containing at least about 75 percent by volume of oxygen to effect the partial combustion of a portion of said carbonaceous products thereby producing carbon monoxide and minimum amounts of carbon dioxide, the total quantity of said oxidant gas utilized in said vertical reaction zone being introduced into said Partial Combustion zone;

(g) introducing steam to said Partial Combustion zone to react with a remaining portion of said carbonaceous products thereby producing hydrogen and carbon monoxide;

(h) controlling the amounts of steam and oxidant gas introduced into said Partial Combustion zone to balance the exothermic heat of reaction of said oxygen and said caronaceous products with the endothermic heat of reaction of said steam and said carbonaceous products while maintaining said Partial Combustion zone at a temperature of about 2800° F. to about 3200° F.;

(i) removing from the upper portion of the vertical reaction zone gaseous effluent containing hydrogen and carbon monoxide in a ratio no greater than about one; and, (j) withdrawing fused slag from the lower portion of the vertical reaction zone. The organic solid waste is preferably municipal solid waste, agricultural refuse, cellulosic matter, food waste, paper waste, sawdust or wood waste.

BACKGROUND OF THE INVENTION

The Simplex Process for the synergistic gasification of coals, especially caking coals, encapsulated in a matrix of cellulosic waste materials such as municipal solid waste (MSW) or biomass, is highly cost-effective in producing a clean synthesis or fuel gas. This novel process makes possible for the first time the use of a shift furnace of blast furnace geometry and dimensions to achieve high productivities in a moving bed gasifier operated at slagging temperatures.

The Simplex Process simultaneously provides an environmentally benign solution to a pollution problem by turning, for example, MSW preferably with dewatered sewage sludge (DSS) admixed with coal into an energy resource, and it produces a clean-burning, medium-heating-value fuel gas at a cost that is competitive with imported petroleum. In a preferred embodiment, the Simplex Process makes possible the efficient utilization of the abundant energy-intensive Eastern bituminous caking coals which have hitherto defied processing in a simple, moving-bed gasifier because of their well-known tendency to swell, melt, coalesce, and polymerize when passing through the temperature range from 900° to 1300° F. The use of the caking coal is accomplished by carefully blending a mixture of shredded, air-classified organic solid waste with crushed caking coal (including fines associated therewith) and then compacting the mixture either prior to or in the process of feeding said mixture to the Simplex gasifier.

It has been found that a number of useful and unexpected advantages accrue when the feed or burden is prepared as more fully described herein. Thus, it is well known that the Lurgi process for the gasification of coal, which is the most firmly established coal gasification process in the world today, is subject to the following disadvantages:

(1) It cannot process caking coals because of the tendency of such coals to agglomerate, bridge, and polymerize when heated to a temperature where they become thermoplastic.

(2) It cannot process crushed coal containing fines but must be screened to eliminate such fines which then constitute a disposal problem.

(3) The upward gas velocity is limited by the small particle size of the coal processed, which in turn limits the permissible productivity per square foot of converter cross-section in the gasification zone.

(4) It has been limited in maximum, practicable furnace size to vessels of approximately 13 feet in diameter so that it requires 26 Lurgi converters to produce the synthesis gas for a single 250 million SCFD SNG plant.

The above limitations of the successful Lurgi gasifier have been experienced on an even larger scale by the blast furnace, which is the heart of the steel industry and one of the sustaining pillars of the Industrial Revolution. The successful operation of the blast furnace, which incidentally functions as a large gasifier, is critically dependent on careful preparation of its three-component burden or feed mixture, i.e., iron ore, coke, and limestone. These components must be carefully sized and blended to insure smooth operation of the gravitating bed without disruptive channelling of the large volume of hot ascending gases produced in the furnace. Careful burden preparation has made it possible to operate these gas producing blast furnaces when scaled to the prodigious diameter of 42 feet. The resulting economies of large scale operation have a decisive impact on the capital and production costs.

The art of pressing coal into briquettes has been known for a century. There, the objective has been principally to utilize coal fines by compacting them into a more easily handled and stored fuel. Similarly, the compaction of household refuse or municipal solid waste is well known. Householders may purchase commercial devices that will form trash and refuse into larger pellets that are more efficiently stored and transported and that occupy less volume in a sanitary landfill. The compaction or pelleting of municipal refuse together with waste coal products has also been proposed. Thus, Jackman in U.S. Pat. No. 3,910,775 discloses the briquetting of coal including coal fines with organic wastes. Jackman makes no mention of the ratios of coal and organic waste and makes no specific reference to problems attendant upon the use of caking coal and in fact, he does not differentiate between the use of different types of coal. He is primarily concerned with the ability to use high sulfur waste coal and is particularly concerned with using fines, although he does mention employing crushed coal.

Apparently, in Jackman the use of minor quantities of acidic coal fines (derived from coal washings or "dirty sulfur-rich unusable coal") is for the purpose of reducing the pH of the sewage stream being filtered through the prepared briquettes so as to precipitate phosphates present in the waste water. The ratios of the components, the physical characteristics of the novel shaped articles, the primary function of these articles, the choice of the coal component in certain embodiments of Applicant's contribution to the art are not disclosed in Jackman who in fact mentions none of these.

It has also been proposed in the art to employ organic solid waste with coal which also can contain oil, in Kaiser U.S. Pat. No. 3,841,851. No mention is made of briquetting. It is furthermore significant that Kaiser (who is contemporaneous with Jackman) in his working example in columns 8-9 utilized only 10% coal, 10% residual fuel oil, and 80% dried household refuse.

OBJECTS OF THE INVENTION

An object of the present invention is to make possible the processing of major proportions of crushed caking coal without encountering troublesome bridging, channelling, agglomeration, or cementing of the moving bed of burden in a gasifier of blast furnace geometry.

Another object is to control the shape and dimensions of the feed material so as to insure uniform gas distribution when employing a gravitating bed gasifier of very large size, i.e., 20 to 40 feet in diameter, and 60 to 120 feet high.

Another object is to form the feed material into extrusions, briquettes, or pellets of adequate structural integrity to withstand the compressive forces and abrasions experienced in a shaft furnace of the indicated geometry and size without being crushed or reduced to fines that would tend to obstruct the free and rapid upward movement of gas.

A further object is to incorporate in the formulation of the feed material certain low-cost or noxious waste materials for the dual purpose of providing an environmentally acceptable form of disposal while serving as a binder that enhances the structural integrity of the said extrusions, briquettes, or pellets.

Still another object is to facilitate the incorporation into the feed material of selected substances, e.g., crushed dolomite, designed to react with, and thus to eliminate with the slag, certain potential pollutants present in the coal or MSW, e.g., sulfur compounds.

Still a further object is to form the feed mixture (which is partially derived from putrescible MSW or biomass) into a more stable configuration that can be more readily transported and stored. Other objects will become apparent in the context of the following disclosure.

SUMMARY OF THE INVENTION

The above are accomplished by the present invention.

In one of its aspects the invention is directed to an improvement in the Simplex Process for the simultaneous gasification of coal and organic solid waste materials, as described in my aforementioned U.S. patent application No. 675,918. The improvement comprises using in said process the feed material or burden in the form of novel discrete compacted acticles of manufacture, e.g., briquettes, of specified composition and geometry, as hereinafter described. The invention also relates to the novel briquettes.

The term briquettes is intended to cover the compacted articles of the invention regardless of their shape, whether solid or with a hole therein, and regardless of the method of compacting. As used in the claims, unless otherwise indicated, the term briquettes includes extrusions, pellets, and other shapes which have been subjected to the requisite compacting.

These articles of manufacture or briquettes are further characterized by having a minimum acceptable standard of structural integrity, for example, at least sufficient to preserve their cohesive strength until they have gravitated through the Drying and Pyrolysis zones to the High Temperature Reaction and Partial Combustion zones in the Simplex Process. The desired structural integrity may be achieved partly through the use of high compaction pressures and partly through the use of suitable binder materials incorporated in the feed mixture. The use of binders is optional, but preferred. When large amounts of coal fines are present, the use of a binder is highly desirable.

The composition of the feed mixture is important to achieve the objectives of this invention. The organic solid waste material is preferably rich in cellulosic matter, such as waste paper in MSW, or wood waste and plant stalks in agricultural refuse. Such agricultural waste can be high in pentosan content, e.g., corn cobs, oat hulls, and plant stalks, or high in lignocellulose, e.g., wood waste. Desirably, the organic solid waste contains at least 50% of the cellulosic material. The MSW is normally comminuted in a shredder or hammer mill; it may then be processed for the recovery of ferromagnetic metals by passing over a magnetic separator or it may be air-classified to separate a light combustible organic fraction from a heavy, noncombustible inorganic fraction comprising predominantly glass and metals. The recovery of recyclable secondary materials by further processing of the inorganic fractions is well known.

The process of U.S. patent application No. 675,918 is particularly advantageous in permitting the efficient gasification of caking coals. The process works equally well with noncaking coals, but the preparation of the burden in terms of preformed briquettes or pellets is not as critical. The present invention is therefore particularly directed to the preparation of novel shaped articles of manufacture comprising a substantial or preponderant quantity of caking coal plus waste, preferably with a binder. It has been found experimentally that when such articles are prepared in accordance with the present invention, the ratio of highly caking coal to organic waste high in cellulosic material may be as high as 3:1, but preferably 5:2 or less, depending on the degree of comminution, the choice of coal, and the composition of the MSW. The waste preferably contains at least 50% of cellulose and/or pentosans and/or lignocellulose. On the other hand, if the ratio of coal to MSW, or other organic waste high in cellulosic material, is less than about 0.5 to 1, the pyrolyzed briquettes or pellets are increasingly deficient in the structural integrity needed to sustain the desired high water gas production rates in the Partial Combustion zone of the gasifier in the Simplex Process.

The shape of the extrusions, briquettes, or pellets may be circular or polygonal (either regular or irregular) in cross-section, and may vary in diameter from 1″ to 12″. Briquettes of similar size may be stamped or pressed in the form of saddles, pillows, hollow cylinders or doughnuts, for example. It has been found that a compaction pressure in excess of 1000 psi in forming the shaped article will give good results. Preferably the pressure in in the range of 2000 to 10,000 psi. The upper limit on the pressure is not critical. As a practical matter, it usually will not exceed 5,000 psi. When employing an extrusion device, it is desirable to equip it with a gate or chopper that will permit the alternation of compaction and extrusion cycles of the ram or augur, so as to permit control of the requisite compaction pressure.

Municipal solid waste (MSW) normally contains 25 to 30% moisture derived in part from food waste and garden clippings. Upon compacting said materials, the expressed juices may impart binder properties to the mixture, especially if high compaction pressures are employed. However, it is generally preferable to employ specifically selected binders as additives to enhance the structural strength of the dried and pyrolyzed pellets for effective processing in the lower gasification zones of the shaft furnace. Such binders are particularly desirable if they also constitute a pollution-free disposal means for a troublesome waste product such as dewatered sewage sludge (DSS), or waste streams of the paper industry, such as lignin black liquor, or sulfite waste liquor. In particular DSS and lignin black liquor have proved effective. Thus, for example, it was found that satisfactory briquettes were obtained when employing 50 parts of a Pittsburgh Seam caking coal, 50 parts of air-classified MSW from the City of Baltimore, and 3 parts of sewage sludge solids from a waste water treatment plant in New York City. It should be noted that the ratio of 50 to 3 is representative of the ratio in which MSW and sewage sludge solids are generated by an American city. Other satisfactory binders are waste oil, black strap molasses, and waste streams from starch manufacture. When employing aqueous binders in preparing the feed mixture, excess water will be expressed during the extrusion or pelleting operation, so that the green briquettes or pellets normally contain some residual moisture, e.g., 10 to 20% moisture as they leave the extruder or press. The amount of binder can be 2 to 6% on a dry basis. It should be sufficient to allow the briquette to retain its structural integrity in the gravitating bed. The binder is particularly needed to compact coal fines at the higher coal/MSW ratios, unless otherwise indicated, all parts and percentages are by weight.

The drying of green briquettes requires a considerable amount of residence time in the shaft furnace, depending on the size and geometry of the briquette. Thus, it was found experimentally that a 3″ diameter × 3″ briquette requires a residence time of 76 minutes to be preheated from 70° F. to 600° F. and totally dried. Much more bulky briquettes, while desirable from a production cost standpoint, would require additional residence time (equivalent to costly converter height) for adequate preheating and drying. In general, it is advantageous to employ a briquette geometry that affords a short route for the diffusion of gases and steam. A preferred embodiment of this invention is therefore the fabrication of extruded hollow regular polygons or hollow cylinders having, for example, an outside "diameter" of 9″ and inside diameter of 3″. Such a hollow 9″ × 9″ cylinder has 30 times the bulk of a solid 3″ × 3″ cylinder, but it will experience the same drying time, since the maximum length of path for the diffusing steam will be 1½″ in either configuration. In addition, the hollow cylinders provide a free passage for the ascending hot gasification and pyrolysis products. Other extended surface geometries, such as Berl saddles, would satisfy the same objective.

The hollow briquettes afford unusual heat transfer advantages. All briquette types can be employed not only with caking coals, but also with anthracite coals, noncaking bituminous coals, subbituminous coals, and lignites.

As indicated previously, in a preferred embodiment of applicant's invention the novel articles of manufacture comprise the abundant, energy-rich but hitherto untractable caking coals in admixture with MSW or other cellulosic waste source such as sylvan waste or biomass preferably with a binder therefor.

The novel extrusions, briquettes or pellets of the instant invention are especially formulated, designed, and fabricated to serve the functional and operational requirements of a feed material or burden that will enhance the performance of the unique gasification process described in copending application Ser. No. 675,918. These novel briquettes, in a preferred embodiment, comprise prime Eastern bituminous caking coal as a significant component, preferably at least the major component, a binder, and air-classified MSW or equivalent to provide a cellulosic, encapsulating matrix for the purpose of absorbing and retaining exuded or condensed tars and oils until these are cracked and hydroformed to noncondensible gaseous products. The resultant gaseous product has only 5 to 10% the volume of conventional combustion products of equivalent energy content so that they may be cost-effectively scrubbed free of potential air pollutants. The gaseous product has a heating value of 330 to 440 Btu/SCF and burns with the same flame temperature as natural gas. These are very useful heating values. The gaseous product can be converted to gas of pipeline quality by well-known means. The admixture of 1 part of coal per part of MSW produces a gas with 4 to 5 times the energy equivalent that would be obtained from the MSW alone while using a coal which generally has been considered as unsatisfactory, i.e., caking coal. Said process thus converts a pollution problem into an energy resource and enhances the utility of our massive reserves of Eastern caking coal.

As previously pointed out there can be included in the feed material dolomite to react with and eliminate certain potantial pollutants present in the coal or MSW, e.g., sulfur compounds. The amount of dolomite will vary depending on the amount of sulfur. Generally, the dolomite is employed in stoichiometric equivalence to the sulfur content of the coal. The dolomite can be employed either by incorporation in the briquette or can be added separately as a feed material.

As compared with the importance of burden preparation in blast furnace practice, the economic consequence of the instant invention of a burden preparation based on the compacting, extrusion, briquetting, or pelleting of a well-blended mixture of crushed coal, specifically a caking coal, and cellulosic organic waste in predetermined proportion is equally dramatic when applied to coal gasification. The novel briquettes must be tailored to conform to certain specifications as defined in the present invention. More particularly, the briquettes must be designed and formulated to conform to a number of essential functional requirements. Thus, when used in the Simplex Process the green briquettes must retain their mechanic strength while permitting efficient drying in the Preheat and Drying zone of the converter. As stated previously, it has been found that these requirements may be met either by employing a sufficiently high compaction pressure without binder, or by incorporating a low-cost binder material in the formulation and employing a lower compaction pressure. The degree of comminution of the organic solid waste material also has a direct bearing on the structural strength of the briquette. In general, the more finely shredded, the greater the strength of the green or dried briquette. As a practical matter, the ratio of briquette diameter to the particle size of shredded MSW should be six or eight-fold. Thus, a 12" briquette will accept waste material measuring 1½" in the longer dimension, while 2" briquettes should be fabricated from refuse shredded to ¼" particles.

The briquette in the Simplex Process must also have adequate structural integrity after passing through the Pyrolysis and Coking zone, so that the fully-coked briquette will not be crushed by the weight of the superpositioned burden or excessively abraded to fines in gravitating to the Partial Combustion zone. It has been found that the strength of the coked briquette is a function of the amount of coal present in the formulation. High ratios of coal to organic solid waste, e.g., MSW, result in stronger coked briquettes than low ratios. As a practical limit, as stated previously, it was found that coal/MSW ratios lower than 1:2 result in briquettes with deficient crushing strength or abrasion resistance. On the other hand, it has been found that caking coal/MSW ratios higher than about 5:2 (or in some cases 3:1) do not afford adequate protection against undesired agglomeration of the charge as it passes into the Pyrolysis and Coking zone. The coal content is thus seen to function as a tar-like binder material that endows the coked briquette with the desired structural qualities of a petroleum coke which successfully withstands the attrition of a gravitating blast furnace charge. The cellulosic waste content functions as an absorbent "blotter" material that accepts and retains the exuded or condensed tars and oils until these are pyrolyzed by exposure to the higher temperatures of the Pyrolysis and Coking zone.

Another unexpected advantage of the novel briquette formulations employed in the present invention is that they result in a more reactive solid reactant than that represented by coke formed from the same coal. Thus, it was found experimentally (see Example 4) that a coked 1:1 coal/MSW briquette has 2.5 times the reactivity of a 100% coal briquette of the same type of coal when reacted with steam at a temperature of 2400° F. Similarly, it was found that a coked 3:2 Simplex briquette has 2.8 times the reactivity of a 100% coal briquette of the identical coal when reacted with carbon dioxide at a temperature of 2700° F. (See Example 5). The significance of this finding is that a single Simplex converter 40 feet in diameter would have the same production capacity as 26 conventional Lurgi gasifiers.

EXAMPLES OF PRACTICAL EMBODIMENTS

Example 1

100 parts of a Pittsburgh Seam caking coal having the following moisture-free analysis: volatiles, 38.6%; fixed carbon, 54.2%; ash, 7.2%; and the following elemental analysis: C: 76.4%; H: 5.2%; O: 7.7%; N: 1.5%; and S: 2.0% are crushed to pass through a 4-mesh screen and added to 50 parts of air-classified municipal solid waste obtained from the Bureau of Mines of College Park, Maryland. The several fractions typically recovered are combined in the weight ratio produced, to give the following analysis: aluminum, 0.5%; leather and rubber, 1.3%; plastics, 7.5%; fabric, 4.6%; corrugated board, 4.7%; paper products, 70.5%; yard waste, 6.7%; waste grit and dirt, 4.2%.

The MSW is shredded to $-\frac{1}{4}''$ and added to the crushed coal in a cement mixer. Three parts by weight of a lignin derivative are added in the form of a black liquor from the paper pulp industry of 48.9% solids content. After thorough mixing, the mix is employed to produce cylindrical briquettes, $3\frac{1}{4}''$ in diameter $\times 3''$ high, using a hydraulic press and an 8" high cylindrical die. A compaction pressure of 2500 psi is applied, using a press time of 2 minutes. The green briquettes are analyzed for moisture content by drying for 24 hours in an oven at a temperature of 250° F. The moisture content is found to be 15.2%. Tested for compressive strength, the green briquette deforms without rupture under an axial compression loading of 15,000 lbs. The dried briquette, under the same unconfined compression test also deforms into a pancake without rupturing. Upon fully coking said briquette in a nitrogen stream at a temperature of 2000° F. for 45 minutes, the charred briquette withstands a compression load of 295 lbs. or 36 psi before cracking into three pieces. The briquette was completely gasified by reaction with oxygen and steam at a temperature of 3000° F., leaving the coal ash and the inerts derived from the MSW in the form of a molten slag.

Example 2

Employing a Pittsburgh Seam caking coal of approximately the same analysis as that specified in Example 1 and Eco-Fuel II, a commercially processed form of municipal solid waste, obtained from Arthur D. Little, Inc., a number of 1¼″ diameter×1″ high cylindrical briquettes were pressed under a pressure of 1800 psi from well blended mixtures having the following ratios of crushed coal to Eco-Fuel II: 100:0, 75:25, 66:33, and 50:50. A starch binder representing 3 parts by weight on a dry basis was added to each formulation.

The green briquettes of each of the above formulations were assembled into stacks three briquettes high and placed in a specially designed furnace which permitted the visual observation of the briquettes through a sight glass while these were exposed to a nitrogen stream heated to a temperature of 1300° F. Thermocouples were provided to measure both the internal temperature of the briquette and the temperature of the gaseous environment.

As the temperature of the briquettes attained the temperature range from 900°–1200° F., the stack of 100% coal briquettes swelled visibly to more than twice its original volume. Its original geometric shape was totally deformed by plastic flow and three separate briquettes were solidly fused into a single misshapened lump. By contrast, the three stacks of briquettes formulated with the admixture of MSW retained their structural integrity throughout the identical exposure and the slight degree of swelling represented a volume increase of less than 10%. Upon cooling, the stacks representing the 50:50 and 66:33 ratios could be separated easily without any evidence of adhesion. The stack representing the 75:25 formulation could also be readily separated but gave some evidence of slight adhesion at the interfaces of the briquettes.

Example 3

Employing a Pittsburgh Seam caking coal of the same composition as in Example 1, and shredded air-classified municipal solid waste from the same source as in Example 1, 2″ diameter×1″ high "hockey puck" briquettes were formed employing a hydraulic press, as in Example 1. The formulations prepared corresponded to coal/MSW mixture ratios of 1:3, 1:2, 1:1, 2:1, and 5:2. A lignin-containing black liquor binder equivalent to 3% on a dry basis was employed in each case.

The briquettes were placed in the test furnace, dried, and pyrolyzed to a final coking temperature of 2000° F. for a total exposure period of 60 minutes. The briquettes were tested for structural integrity by determining the compressive strength by means of an unconfined compression test on an Instron tester. The results of these tests are listed in the following tabulation:

| Briquette Formulation Ratio, Coal/MSW | Compressive Strength, Psi Axial Direction |
| --- | --- |
| 1:3 | 15.8 |
| 1:2 | 29.6 |
| 1:1 | 37.4 |
| 2:1 | 41.2 |
| 5:2 | 48.7 |

Example 4

Employing a Pittsburgh Seam caking coal and shredded air-classified MSW of the same source and composition as those specified in Example 1, 2″ diameter×1″ "hockey puck" briquettes were formed under a pressure of 3000 psi, employing 3% sewage sludge solids as a binder material. Briquettes were prepared with coal/MSW ratios of 100:0, 66:33, 50:50 and coked in a stream of nitrogen at 2000° F.

The coked briquettes exhibited good structural integrity when cooled and examined. They were weighed, put back into the furnace, heated to a temperature of 2400° F. in a stream of nitrogen, and then reacted with steam at that temperature by feeding an equal volume of steam to the preheated nitrogen stream. The relative rates of reaction of the three briquette formulations with steam were calculated from the weight loss experienced by each briquette after an exposure of 15 minutes to the identical environment. The reaction rates tabulated below were consistent with the carbon monoxide and hydrogen concentrations determined in the effluent gas stream by gas chromatographic analysis.

| Briquette Formulation Ratio, Coal/MSW | Relative Reaction Rate %, C/Minute |
| --- | --- |
| 100:0 | 2.75 |
| 66:33 | 3.41 |
| 50:50 | 3.87 |

Example 5

Employing fully coked briquettes of the same dimensions and composition as those used in Example 4, these were heated in a stream of nitrogen to a temperature of 2700° F. in a specially designed test furnace equipped with an electric arc torch. An equal volume of carbon dioxide was then introduced as a sidestream, and a power input was adjusted to maintain the desired reaction temperature of 2700° F. After 12 minutes exposure to this 50—50 $N_2CO_2$ stream, the briquettes were quenched in a cold stream of nitrogen. Weight loss determinations were made upon recovering the cooled briquettes from the furnace. Expressed as a percentage of the carbon content consumed by reaction with $CO_2$, the relative reaction rates were as follows:

| Briquette Formulation Ratio, Coal/MSW | Relative Reaction Rate %, C/Minute |
| --- | --- |
| 100:0 | 2.28 |
| 66:33 | 3.90 |
| 50:50 | 4.21 |

Example 6

Employing 50 parts of shredded, air-classified MSW of the same approximate composition as in Example 1, 50 parts of a crushed Pittsburgh Seam coal containing 4.6% sulfur, 3 parts of cooked starch binder (dry basis), and 7.2 parts of finely crushed dolomite, the well-blended mixture was formed into 3″ diam.×3″ briquettes with a compaction pressure of 3000 psi. A charge of 200 such briquettes was processed in an experimental shaft furnace by feeding a mixture of oxygen and steam to the base of the gasifier to maintain a slagging temperature in the hearth section. The product gas was analyzed for sulfur-bearing impurities. A similar run was made with a briquette charge of similar composition except that the admixture of crushed dolomite was omitted, and the resultant product gas was again analyzed for sulfur-bearing impurities. A comparison of results showed that the run made with dolomite-freighted briquettes produced a product gas containing 21.2% as much of the sulfur-bearing contaminants as the product gas of the control run without dolomite addition.

Example 7

Employing shredded, air-classified MSW and crushed Pittsburgh Seam coal of the composition given in Example 1, a coal/MSW ratio of 3:2, 3% of a waste oil binder (based on the dry weight of the total formulation) a large briquette was formed under a pressure of 2700 psi, having a height of 9", an outside diameter of 9", and a concentric cylindrical hole with a diameter of 3". This briquette was placed in a drying oven purged with a small stream of nitrogen and maintained at a temperature of 600° F. A 3" dia.×3" solid cylindrical briquette made from the same ingredients and the same concentrations as the hollow 9"×9" briquette was placed in the same oven at the same time. Both briquettes were instrumented with chromel-alumel thermocouples. In the 3" briquette this thermocouple was placed along the axis, 1½" from either face. In the larger hollow briquette (which contained approximately 30 times the bulk of the smaller solid briquette) three thermocouples were introduced about 1¼" from the periphery measured in a radial direction and spaced approximately 120 degrees apart, terminating respectively 2", 4½", and 7" from the lower face. A plot of the time-temperature profiles indicated distinctive drying plateaus during which the temperature remained at approximately 212° F. The length of the drying plateau of the small solid briquette was 46 minutes, while that of the large, hollow briquette was 49 minutes.

Example 8

Employing shredded, air-classified municipal solid waste and crushed Pittsburgh Seam caking coal from the same sources and having the same composition as given in Example 1, 2¼" diameter×2" cylindrical briquettes were formed with the addition of a small quantity of added water. Applying a compaction pressure of 5800 psi, briquettes were made with coal/MSW ratios of 1:1, 2:1, and 3:1. All three briquette formulations exhibited satisfactory structural integrity, both in the "green" state (with a moisture content of ca 13%) and after drying in a 250° F. oven for 24 hours. After coking in a stream of nitrogen at 1900° F., the briquettes fractured under compression loadings of 39, 28, and 20 psi in descending order of coal content.

Example 9

Employing 50 parts of a Western coal from Rosebud County, Montana having the following proximate analysis: Moisture, 20.8%; volatile matter, 30.6%; fixed carbon, 41.2%; ash, 7.4% and, the following elemental analysis (dry basis): hydrogen, 4.5%; carbon, 68.7%; oxygen, 15.7%; nitrogen, 0.9%; sulfur, 0.9%. 50 parts of roughly ground wood pulp, and 4 parts of rejected crankcase oil, 3¼" diameter×3" solid briquettes were formed under a compaction pressure of 3200 psi. 180 of the dried briquettes were quartered by being cut in half in both directions with a bandsaw and charged to a shaft furnace 10' high, having a cross-section of 81 sq. inches. The column of briquettes was supported on a zirconia grid near the base of the furnace. An electric arc torch was employed to heat the lower strata of the briquette charge to 1000° F. in a stream of nitrogen. Separate streams of 50% oxygen in nitrogen and steam were then fed to the base of the shaft furnace, and the temperature in the Partial Combustion zone was allowed to rise to 2900° F. (with the arc torch extinguished). The run was continued for 85 minutes, during which period 75% of the charge was consumed. No evidence of agglomeration, bridging, or channelling was observed during the course of this batch run. A gas sample taken half-way through the run gave the following analysis:

$CO$:42.5%; $H_2$:37.6%; $CO_2$:12%; $CH_4$:5.7%; $C_xH_y$, 1.5%; $H_2S$,0.4%.

The above analysis is expressed on a nitrogen and moisture-free basis.

What is claimed is:

1. A high structural strength abrasion resistant briquette suitable for utilization in a gravitating burden gasifier process comprising a high pressure compacted well-blended mixture of shredded cellulosic solid organic waste, crushed caking coal and a binder material, the caking coal being in the weight ratio of 0.5 to 3.0 parts per part of solid organic waste.

2. A briquette according to claim 1 wherein the solid organic waste comprises a major amount of cellulosic material.

3. A briquette according to claim 1 wherein the weight ratio of caking coal to solid organic waste is 0.7 to 2.5:1.

4. A briquette according to claim 3 wherein the solid organic waste comprises a major amount of cellulosic material.

5. A briquette according to claim 4 wherein the weight ratio of caking coal to solid organic waste is about 1:1.

6. A high structural strength briquette according to claim 1 wherein the compression molding forces have been between 1,000 and 10,000 psi, the cellulosic organic waste is selected from a group of materials consisting of municipal solid waste, agricultural refuse, food waste, paper waste, shredded wood, wood waste or any cellulose rich materials; and the binder material is selected from a group consisting of water, sewage sludge, lignin containing waste liquor, tar oil condensate, black strap molasses or any starch waste material.

7. A briquette according to claim 6 wherein the amount of binder is present in a concentration between 2 and 6% by weight in amounts sufficient to maintain structural integrity of the briquette in the drying and pyrolysis zones of a gravitating burden gasifier process.

8. A briquette according to claim 6 wherein a base forming calcium compound is included in the briquette in amounts substantially equivalent to the sulfur present in the other component materials of the briquette.

9. A briquette according to claim 8 wherein there is also present in the briquette dolomite in an amount sufficient to react with the sulfur components of the briquette.

10. A briquette according to claim 8 which in the geometrical shape of a perforated solid.

* * * * *